United States Patent [19]

Dunbar et al.

[11] Patent Number: 5,235,423
[45] Date of Patent: Aug. 10, 1993

[54] CONTROLLABLE PSEUDO RANDOM NOISE PATTERN GENERATOR FOR USE IN VIDEO SPECIAL EFFECTS

[75] Inventors: Brion L. Dunbar, Grass Valley; John Abt, Nevada City; James A. Delwiche, Grass Valley, all of Calif.

[73] Assignee: The Grass Valley Group, Inc., Grass Valley, Calif.

[21] Appl. No.: 973,590

[22] Filed: Nov. 9, 1992

Related U.S. Application Data

[63] Continuation of Ser. No. 745,813, Aug. 16, 1991, abandoned.

[51] Int. Cl.$^5$ ............................................. H04N 5/262
[52] U.S. Cl. ....................................... 358/160; 380/46; 358/182
[58] Field of Search ................ 358/182, 183, 168, 22; 380/46, 47, 42

[56] References Cited

U.S. PATENT DOCUMENTS

| | | | |
|---|---|---|---|
| 4,264,781 | 4/1981 | Oosterbaan et al. | 380/46 |
| 4,649,419 | 3/1987 | Arragon et al. | 380/46 X |
| 4,755,969 | 7/1988 | Pappas | 380/46 X |
| 4,797,922 | 1/1989 | Masey et al. | 380/46 |
| 4,974,083 | 11/1990 | Bloomfield et al. | 358/182 |

OTHER PUBLICATIONS

*Encyclopedia of Pulse Circuit Technology*, Ohm Corp., 1980, p.315.

Primary Examiner—Mark R. Powell
Attorney, Agent, or Firm—John Smith-Hill

[57] ABSTRACT

A pseudo-random pattern generator has modifiable feedback so that a variety of pseudo-random video patterns can be generated and used either directly, or after further manipulation, to control the mixing of two video sources. Control of a multiplexer allows a variety of pattern lengths to be selected by altering which stages of a shift register are supplied to a feedback exclusive-OR gate. Patterns with controllable granularity can be achieved by stretching each part of the noise pattern a selectable number of times along either or both axes. Horizontal stretching is achieved by clocking the shift register more slowly than the rate at which it is being read out. Vertical stretching is achieved by repeating the same pattern on each of a selectable number of consecutive lines. Varying the ratio of the stretching along the horizontal axis to the stretching along the vertical axis allows the aspect ratio of the grains of the pattern to be controlled. The values that are used to initialize the shift register can also be altered to achieve additional variation in the patterns generated. Two (or more) modifiable pseudo-random pattern generators can be used in combination with an array of selectable filters to provide a controllable noise pattern generator with coarse and fine pattern controls and selectable filtering of the output patterns produced.

25 Claims, 4 Drawing Sheets

MATTE TEXTURE MENU

| H STRETCH A | V STRETCH A | LENGTH A | SOURCE | H STRETCH B | V STRETCH B | LENGTH B | FILTER |
|---|---|---|---|---|---|---|---|
| 1:1 | 1:1 | 1 | 1 | 1:1 | 1:1 | 1 | |
| 2:1 | 2:1 | 2 | 2 | 2:1 | 2:1 | 2 | |
| 3:1 | 3:1 | 3 | 3 | 3:1 | 3:1 | 3 | HIGH PASS |
| 4:1 | 4:1 | 4 | 4 | 4:1 | 4:1 | 4 | SMOOTH |
| 5:1 | 5:1 | 5 | 5 | 5:1 | 5:1 | 5 | CHROMA |
| 6:1 | 6:1 | 6 | 6 | 6:1 | 6:1 | 6 | NONE |

38

F1　F2　F3　F4　F5　F6　F7　F8　EXIT

Fig. 6

CONTROLLABLE PSEUDO RANDOM NOISE PATTERN GENERATOR FOR USE IN VIDEO SPECIAL EFFECTS

This is a continuation of application Ser. No. 07/745,813 filed Aug. 16, 1991, now abandoned.

BACKGROUND OF THE INVENTION

This invention relates to video special effects, and more particularly to a controllable noise pattern generator for use in video special effects.

In the prior art, random number generators or random pattern generators have been used in video special effects as video noise sources to modify a matte with a textured effect. These textured mattes can then be used to create a textured "wipe" signal for controlling a transition between two other video sources, or to produce a rough edge or texture on some other pattern.

A pseudo-random number generator (PRNG) can be used to produce a series of pseudo-random numbers that translate into a pattern of noise on the raster scan of a video display. Each number can be used directly as a luminance or chrominance value for individual pixels, or, preferably, each number can be used as a key or mixing control signal to randomly mix two other video signals on a pixel-by-pixel basis.

A source of pseudo-random numbers that can be used for this purpose is a linear feedback shift register (LFSR) with two or more stages exclusive-ORed (XORed) together and fed back to the input to create a pseudo-random pattern generator. The desired pseudo-random pattern output is obtained by combining the output from a number of stages into a parallel word that is then interpreted as a binary number.

While the sequence of outputs that is produced from a pseudo-random pattern generator has the property of being pseudo-random, the same pattern repeats identically every $2^n - 1$ clock cycles, where "n" is the number of stages in the shift register. For example, a 10-stage linear feedback shift register with stages 7 and 10 exclusive-ORed together and fed back to the input to stage 1 will produce a pseudo-random output sequence that repeats every $2^{10} - 1$ clocks, with that same sequence then repeating again and again.

If the pseudo-random pattern generator is clocked at the frequency of video pixel occurrences and the numbers that it produces are used to create 10-bit digital video key signals and those key signals are used to control the mixture of two video sources, a "noise pattern" is produced in the resulting video image. If the length of the shift register produces a sequence of pseudo-random numbers that has fewer elements than the number of pixels in a television raster, this noise pattern repeats and becomes noticeable in direct proportion to how many times it is repeated in one field of video, i.e., the smaller the pattern is and the more times it is repeated on the screen, the more visible it becomes. Conversely, if the length of the shift register is chosen to produce a sequence of pseudo-random numbers larger or nearly as large as the number of pixels in a field of video, the observed pattern is no longer detectable by the human eye.

SUMMARY OF THE INVENTION

In accordance with the invention, there is provided a pseudo-random pattern generator with modifiable feedback so that a variety of pseudo-random video patterns can be generated and used either directly, or after further manipulation, to control the mixing of two video sources. Control of a multiplexer allows a variety of pattern lengths to be selected by altering which stages of a shift register are used as feedback. Patterns with controllable granularity can be achieved by stretching each part of the noise pattern a selectable number of times along either or both axes. Horizontal stretching is achieved by clocking the shift register more slowly than the rate at which it is being read out. Vertical stretching is achieved by repeating the same pattern on each of a selectable number of consecutive lines. Varying the ratio of the stretching along the horizontal axis to the stretching along the vertical axis allows the aspect ratio of the grains of the pattern to be controlled. The values that are used to initialize the shift register can also be altered to achieve additional variation in the patterns generated. Two modifiable pseudo-random pattern generators can be used in combination with an array of selectable filters to provide a controllable noise pattern generator with coarse and fine pattern controls and selectable filtering of the output patterns produced.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIG. 6 is an illustration of a user interface menu for controlling a controllable noise pattern generator according to the present invention.

DETAILED DESCRIPTION

Figure 1A:
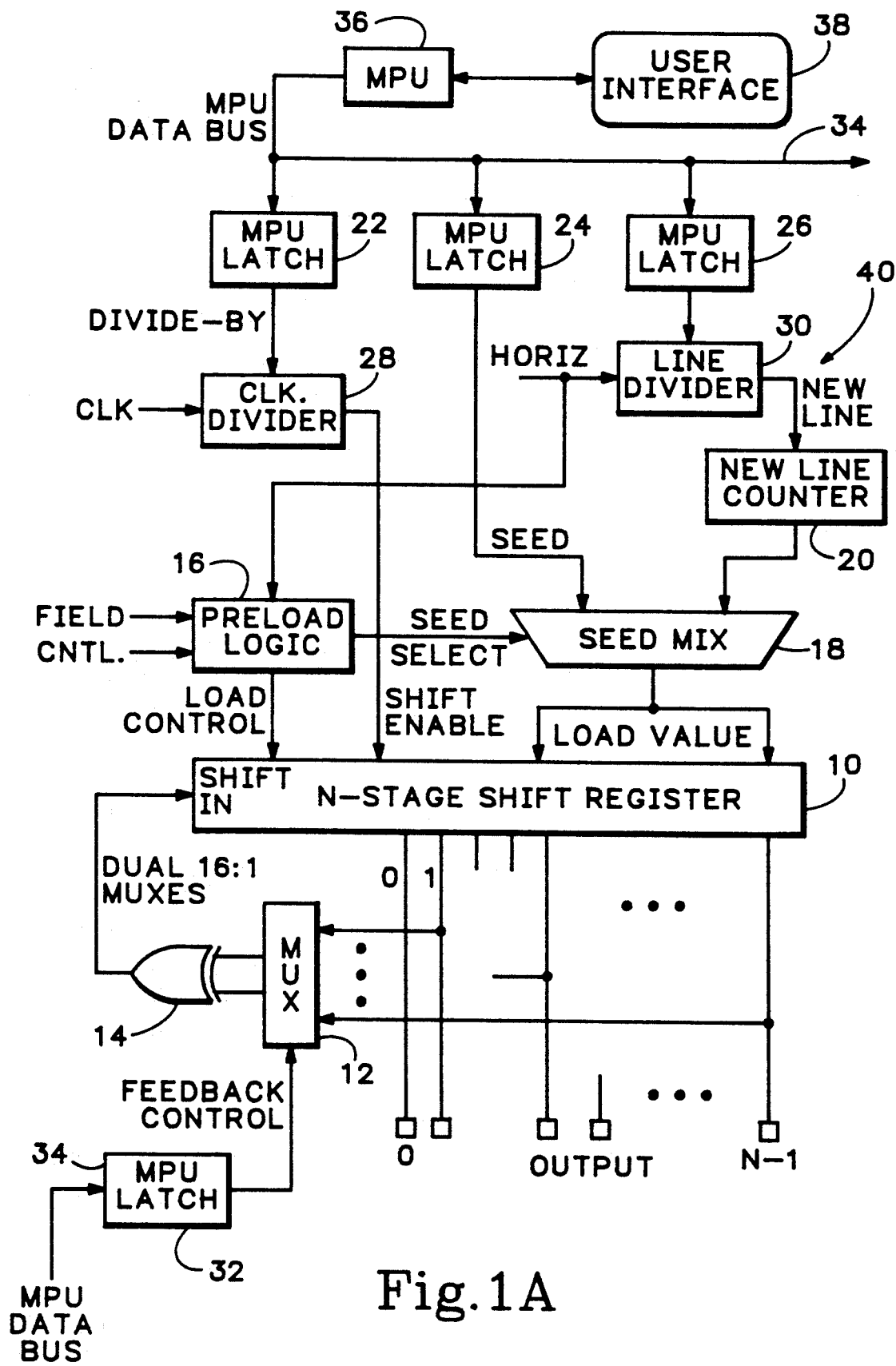
FIG. 1A is a block diagram of a modifiable pseudo-random pattern generator and control circuitry according to the present invention.

Referring to FIG. 1, a pseudo-random pattern generator with modifiable feedback or modifiable pseudo-random pattern generator (MPRPG) 40 is created by controlling the feedback to, initialization of, clocking and loading of an N-stage shift register 10. The N-stage shift register 10 has a shift input, a load control input, a shift enable input and a parallel load value input, and produces parallel output data bits 0 to $N-1$. The bits of the parallel output of the N-stage shift register 10, or a subset of those bits, are available as a noise source and are applied to the inputs of feedback multiplexer 12. The output of feedback multiplexer 12 is two bits of feedback to XOR gate 14. The effective length, n, of the N-stage shift register 10 can be controlled by the choice of the most significant bit of the N-stage shift register that is fed back. Feedback control signals are latched into feedback control latch 32 from a microprocessor unit (MPU) 36 data bus 34 to effect the selection of which output stages are to be provided as the two bits of feedback to the XOR gate 14.

For a given number of stages in the shift register, the maximum number of pseudo-random numbers that can be produced in the sequence before they start to repeat is $2^n - 1$. This is because all zeros is a disallowed state, since all zeros will produce nothing but more zeros when XORed and fed back.

To obtain a sequence with the maximum length, one of the stages that is fed back must be the last stage. The choice of the other stage or stages used for feedback is also critical to realizing a maximum length sequence. There are, in general, only a maximum of two choices for the second feedback stage that provide the maximum length output sequence, and these two choices are actually only just the reverse of each other, producing the same series of numbers but in the opposite order. For example, a 10-stage linear feedback shift register with stages 3 and 10 used as feedback, will produce the same numbers but in the opposite order as the 10-stage linear feedback shift register with stages 7 and 10 used as the feedback. The complement of either of these forward or reverse numerical sequences can also be obtained by substituting an exclusive-NOR gate for the exclusive-OR gate, producing another two sequences that are the complements of the first two.

For application as a video signal noise source, register lengths of from 7 to 20, are of primary interest. These register lengths produce sequence lengths from 127 to 1,048,575, providing a range of patterns that vary in length from less than one line to more than a whole frame of video. Therefore, a reasonable value for N in the N-stage shift register 10 is N=20, thus permitting selection of effective lengths that vary from 7 to 20.

Figure 1B:
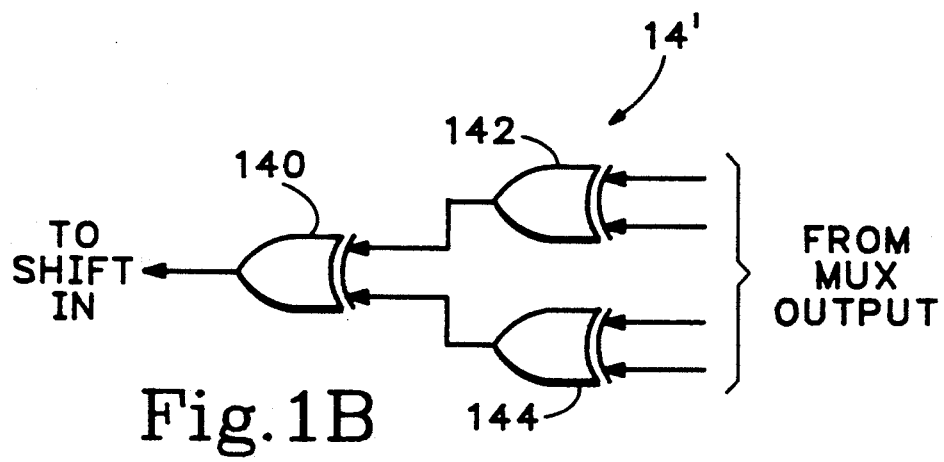
FIG. 1B is a supplement to FIG. 1A showing an alternative to one of the block shown therein.

For shift registers of many lengths there are no simple combinations of two stages that can be fed back to obtain a maximum length output sequence. Shift registers of these lengths require more feedback to obtain a maximum length output sequence, e.g., feedback from four stages combined through three exclusive-OR gates. Within the range of lengths from 7 to 20, lengths of 8, 12, 13, 14, 16 and 19 are of the type that requires four stages to be fed back in order to achieve a maximum length output sequence. Four stages can be used as feedback if the exclusive-OR gate 14 is replaced with three exclusive-OR gates 14', with two of those exclusive-OR gates 142 and 144 receiving the four stages at their inputs and their outputs are provided to the inputs of the third replacement exclusive-OR gate 140, as shown in FIG. 1B. Such an implementation, in which all rather than a sub-set of possible sequence lengths are available, might be preferred for some applications.

The following table gives the necessary connections for producing maximum length sequences from the set of register lengths that only require two stages of feedback to produce their maximum length sequences:

| TABLE OF FEEDBACK CONNECTIONS | | |
| --- | --- | --- |
| Number of Effective Stages | Resulting Sequence Length | Stages Used For Feedback |
| 7 | 127 | 7 and 1 or 6 |
| 9 | 511 | 9 and 4 or 5 |
| 10 | 1023 | 10 and 3 or 7 |
| 11 | 2047 | 11 and 2 or 9 |
| 15 | 32,767 | 15 and 1 or 14 |
| 17 | 131,071 | 17 and 3 or 14 |
| 18 | 262,143 | 18 and 7 or 11 |
| 20 | 1,048,575 | 20 and 3 or 17 |

Selecting between the foregoing alternatives for feedback allows the N(=20)-stage shift register 10 to have any of the effective lengths shown in the Table above. User selections made at the user interface 38 are processed by the MPU 36 into feedback control signals that are placed on the MPU data bus 34 and latched into MPU latch 32, from which they control the feedback multiplexer 12.

While noise patterns of various sizes can be produced by varying the length of the pseudo-random pattern, additional effects may also be achieved by further control over the behavior of the N-stage shift register 10. One such difference, but one that only produces a noticeable difference in the case of small pattern sizes, is to load the N-stage shift register 10 with different initialization or "seed" numbers. To accomplish this, the MPU 36 passes different seed values to MPU latch 24 over the MPU data bus 34. MPU latch 24 then supplies these alternative seed values to seed multiplexer 18 where they are selected according to the seed select signals from the preload logic 16. These seed values may be interspersed with a hard-wired mixture of ones and zeros. The value loaded, however derived, must always include at least one "1" to ensure avoiding the all zeros state.

More significant differences in the appearance of the patterns that are produced by the MPRPG 40 can be achieved by varying other parameters to introduce stretching or expansion of the parts of pattern along one or both axes. If this is done along both axes, the result is a granularity in the resulting noise pattern.

Clock divider 28 receives the system clock that occurs at the pixel data rate. The clock divider 28 then, either passes that clock on as is (divide-by-1), or divides it by a user selectable integer greater than one to produce pulses one clock cycle wide every n-th system clocks. The user makes this selection at the user interface 38. This selection is then processed by the MPU 36 and appropriate data is passed to clock divider 28 via the MPU data bus 34 and MPU latch 22. When the clock divider 28 is dividing by one, each consecutive adjacent pixel receives a new pseudo-random number from the MPRPG 40. However, when the clock divider 28 is dividing by a number larger than one, that number of consecutive adjacent pixels receive the same pseudo-random number. The result is a stretching of the pattern along the horizontal axis.

Stretching along the vertical axis is somewhat more complicated. Stretching along the vertical axis requires the same pattern to be repeated on several consecutive lines. The number of lines over which a pattern is repeated is determined by a divide-by number from the MPU 36. This number is passed to the line divider 30 via the MPU data bus 34 and MPU line divide latch 26. A signal indicative of the beginning of the horizontal line interval, horiz, is then divided by the selected number to produce a signal, new line, that indicates that the next line is to be different than the preceding one.

The preload logic 16 also receives the horiz signal and produces a load control signal at the beginning of each line. When vertical stretching has been selected by an operator, the load value at the beginning of each line that is selected by the seed select signal is a mixture of the seed values from the MPU seed latch 24 and the value from the new line counter 20. If the next line is to have the same appearance as the last line, the new line counter 20 will not have incremented and the load value presented by the seed multiplexer 18 for loading at the beginning of this line is the same value that was presented and loaded at the beginning of the last line. When the desired number of lines have been painted with the same pseudo-random pattern, the line divider 30 produces a new line signal and the new line counter 20 increments. The new value in the new line counter 20 is then part of a new load value presented by the seed mux 18 to the load inputs of the N-stage shift register 10. Thus, the next set of lines, the number of which is determined by the divide-by value in the MPU divide-by latch 26, will all contain a new random pattern, producing a vertically stretched pattern.

The two techniques described above can be combined to produce patterns that are stretched in both the vertical and horizontal dimensions, producing a granular effect. By mixing and matching the horizontal and vertical stretching values, patterns with grains having any desired size and aspect ratio may be obtained.

In response to its "field" signal input, the preload logic generates a load control signal at the beginning of each new field of video. This synchronizes the noise pattern to the image so that the same pattern is repeated every field.

Figure 2:
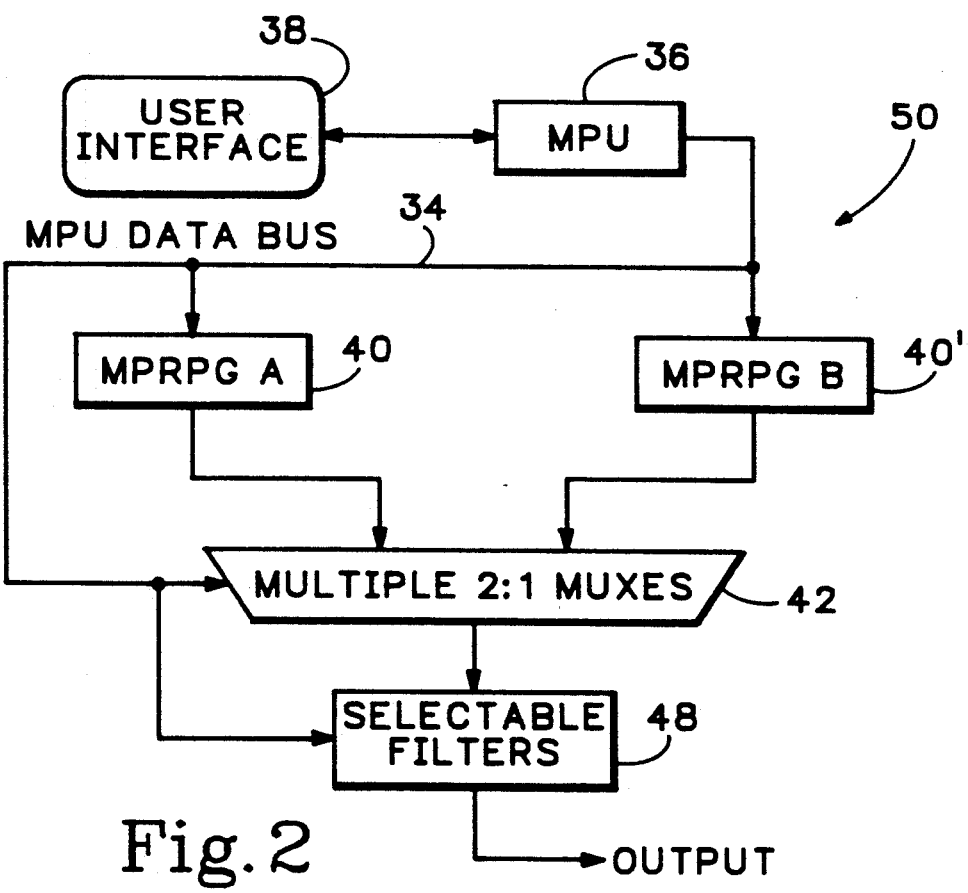
FIG. 2 is a block diagram of a controllable noise pattern generator according to the present invention.

Referring now to FIG. 2, a controllable noise pattern generator (CNPG) 50 for video applications includes two MPRPGs 40 and 40' whose outputs are selectably multiplexed together. In this configuration, the user controls both MPRPGs 40, 40', multiple 2:1 multiplexers 42 that select their outputs, and an array of selectable filters 48 through the user interface 38, the MPU 36 and the MPU data bus 34.

Intermixing the outputs of the two MPRPGs 40 and 40' via multiplexers 42 according to user selections allows the controllable noise pattern generator 50 to produce patterns that are "softer", or more natural looking, than those that are available through the use of a single MPRPG 40. In one implementation, one MPRPG is used to provide the main pattern by supplying the more significant bits of the key signal, while the second MPRPG is used for the less significant bits to provide softening of that main pattern with a sub-pattern. In another implementation, some of the less significant bits are alternated every field between the two MPRPGs. And, in yet another embodiment, more than two MPRPGs are included in the CNPG and a separate MPRPG is used to produce each bit.

The array of selectable filters 48 may include low pass or smoothing filters, high pass filters and a tunable bandpass filter or a bank of bandpass filters for different frequencies. These filters may be either 1-dimensional or 2-dimensional. In one implementation, a highpass filter, a smoothing filter and a chroma notch filter, as well as no filtering, are provided as user selectable choices, and each of the filters are 2-dimensional. The highpass filter accentuates the edges of the pattern, while the lowpass, smoothing filter blurs the edges. The chroma notch filter also creates some smoothing as it eliminates those high frequency components near the color subcarrier to prevent cross-color artifacts.

Figure 3:
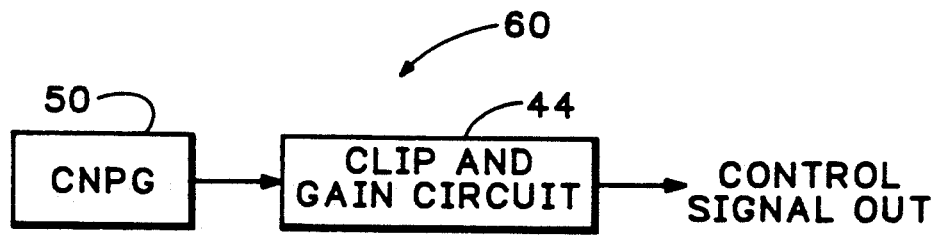
FIG. 3 is a block diagram showing how a controllable noise pattern generator can be used in conjunction with a clip and gain circuit to produce a control signal.

Referring now to FIG. 3, the output of the controllable noise pattern generator 50 can be modified by a clip and gain circuit 44 to produce a control signal output with different limits and scaling. This control signal can then be used to produce full screens of textured matte within which grays can be biased towards white, or toward black, or toward both to provide a pattern of almost all black and white noise. Or, black and white spots can be softened toward a more neutral gray, or other ranges of gray.

Figure 4:
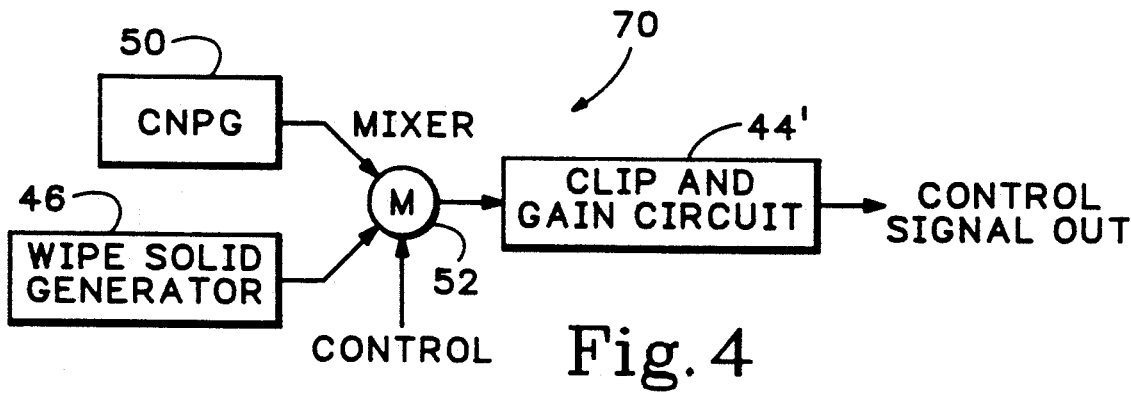
FIG. 4 is a block diagram showing another means of producing a control signal from the output of a controllable noise pattern generator.

Alternatively, referring to FIG. 4, the output of the controllable noise pattern generator 50 can be mixed in mixer 52 with the output of a wipe solid generator 46 according to a control input, such as an operator controlled knob, to produce a textured wipe solid output. This textured wipe solid signal can then be applied to a clip and gain circuit 44' to produce a control signal output a textured wipe that is further modified to the operators taste. A wipe solid generator 50 is described in U. S. Pat. No. 4,805,022 to John Abt for "Digital Wipe Generator", hereby incorporated by reference.

Figure 5:
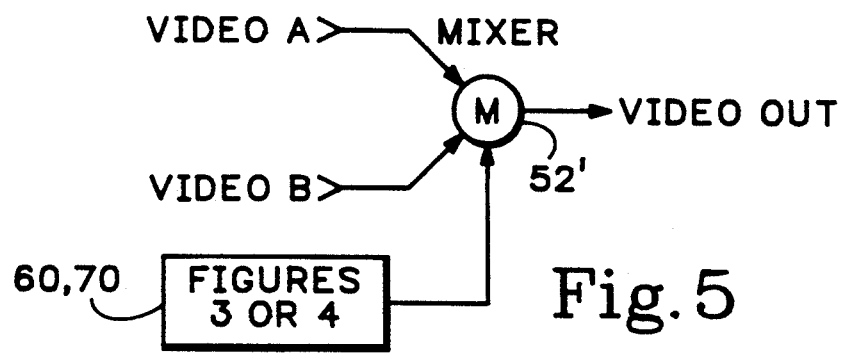
FIG. 5 is a block diagram showing how the outputs of the circuits shown in FIGS. 3 and 4 can be utilized to control the mixing of two video sources.

Referring now to FIG. 5, the output of either the first control signal circuit 60 shown in FIG. 3 or the second control signal circuit 70 shown in FIG. 4 can be used in this circuit to control the type of mixing that occurs in mixer 52' between video source A and video source B. If the first control signal circuit 60 output is used as the control input to mixer 52', the two video sources are randomly mixed over full image according to the noise pattern from the controllable noise pattern generator 50 as modified by the clip and gain circuit 44. If the second control signal circuit 60 output is used as the control input to mixer 52', the two video sources are mixed according to the wipe solid generator 46 output function as modified by the noise pattern from the controllable noise pattern generator 50.

FIG. 6 is an example of a user interface 38 menu, the MATTE TEXTURE MENU, that is suitable for accepting operator input to the controllable noise pattern generator 50. Associated with function key F1 are six selections for "H Stretch A", the horizontal stretching factor for MPRPG A. As can be seen, the available choices range from 1:1, or no stretching, to 6:1, the maximum stretching factor available. Similar choices are available for the vertical stretching of MPRPG A associated with function key F2, for the horizontal stretching of MPRPG B associated with function key F5, and for the vertical stretching of MPRPG B associated with function key F6.

The choices provided for "Length A" and "Length B", numbers 1-6, allow the user to select progressively longer patterns. "1" selects the shortest available pattern and "6" selects the longest available pattern, with the other numbers, "2" through "5" representing pattern choices of intermediate length. The selections for "Source" control the multiple 2:1 multiplexers 42 shown in FIG. 2. "1" represents all bits being from MPRPG A, "6" represents all bits being from MPRPG B, and the choices in-between representing increasing numbers of bits being from MPRPG B as the selection number increases. The final choice available in the MATTE TEXTURE MENU is the choice of the "Filter" selected from the array of selectable filters 48. The available choices in this example are HIGH PASS, SMOOTH (low pass), CHROMA and NONE.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true scope of the invention.

I claim:

1. A modifiable pseudo-random pattern generator, comprising:
   pseudo-random pattern generation means having an enable input and producing an output pattern of numbers; and
   means for dividing a system clock signal, the dividing means being disposed on the enable input of the pseudo-random pattern generation means to divide the system clock signal by a number to produce an enable pulse that occurs less frequently than the system clock signal so that numbers produced by the modifiable pseudo-random pattern generator can be made to persist for a number of periods of the system clock signal.

2. A modifiable pseudo-random pattern generator according to claim 1 wherein the pseudo-random pattern generation means also has a load input and a load control input, a load value being loaded into the load input upon the occurrence of a load control signal at the load control input, and the modifiable pseudo-random pattern generator further comprises:
   means for dividing a horizontal signal occurring once per interval of a device utilizing the output pattern by an integer to produce a new line signal;
   means for modifying the load value upon the occurrence of the new line signal; and
   means for supplying the load control signal to the load control input of the pseudo-random pattern generation means upon the occurrence of each horizontal signal so that identical patterns are produced by the modifiable pseudo-random pattern generator the integer number of times until a new line signal occurs.

3. A modifiable pseudo-random pattern generator according to claim 1 wherein the pseudo-random pattern generation means includes a feedback path and the pseudo-random pattern generation means further comprises a feedback modifying means disposed in the feedback path to modify the output pattern.

4. A modifiable pseudo-random pattern generator comprising:
   pseudo-random pattern generation means having a load input and a load control input and producing an output pattern of numbers, a load value being loaded upon the occurrence of a load control signal at the load control input;
   means for dividing a horizontal signal occurring once per interval of a device utilizing the output pattern by an integer to produce a new line signal;
   means for modifying the load value upon the occurrence of the new line signal; and
   means for supplying the load control signal to the load control input of the pseudo-random pattern generation means upon the occurrence of each horizontal signal so that identical patterns are produced by the modifiable pseudo-random pattern generator the integer number of times until a new line signal occurs.

5. A modifiable pseudo-random pattern generator according to claim 4 wherein the pseudo-random pattern generation means includes a feedback path and the pseudo-random pattern generation means further comprises a feedback modifying means disposed in the feedback path to modify the output pattern.

6. A modifiable pseudo-random pattern generator according to claim 4 wherein the pseudo-random pattern generation means includes a shift register for receiving the load value upon the occurrence of the load control signal.

7. A modifiable pseudo-random pattern generator comprising:
   pseudo-random pattern generation means having a load input and a load control input and producing an output pattern of numbers, a load value being loaded upon the occurrence of a load control signal at the load control input; and
   means for modifying the load value so that the pattern produced by the modifiable pseudo-random pattern generator is modified following the occurrence of the load control input.

8. A modifiable pseudo-random pattern generator according to claim 7 wherein the pseudo-random pattern generation means includes a feedback path and the pseudo-random pattern generation means further comprises a feedback modifying means disposed in the feedback path to modify the output pattern.

9. A modifiable pseudo-random pattern generator according to claim 7 wherein the pseudo-random pattern generation means includes a shift register for receiving the load value upon the occurrence of the load control signal.

10. A modifiable pseudo-random pattern generator comprising:
    pseudo-random pattern generation means having a feedback path and producing an output pattern of numbers;
    feedback modifying means disposed in the feedback path for changing the feedback to modify the output pattern, said feedback modifying means comprising a multiplexer having a control input and data inputs coupled to receive bits of the numbers of the output pattern, the multiplexer producing at least first and second outputs, the first and second outputs being selected from the received bits according to the state of the control input; and
    an exclusive-OR means receiving the outputs of the multiplexer and producing a modified feedback signal.

11. A modifiable pseudo-random pattern generator according to claim 10 wherein the multiplexer also produces third and fourth outputs for selection and the exclusive-OR means comprises three exclusive-OR gates with the outputs of two of the exclusive-OR gates supplying inputs to the third exclusive-OR gate.

12. A modifiable pseudo-random pattern generator comprising:
    pseudo-random pattern generation means including a feedback path and producing an output pattern of numbers, said pseudo-random pattern generation means comprising an N stage shift register having as the feedback path outputs from two stages coupled to an input through an exclusive-OR gate, bit outputs of some or all of the N stages forming the numbers of the output pattern;
    controllable feedback modifying means disposed in the feedback path and responsive to a control signal for changing the feedback to modify the output pattern; and control means for producing the control signal.

13. A modifiable pseudo-random pattern generator according to claim 12 wherein the feedback modifying means comprises:

a multiplexer having a control input and data inputs coupled to receive the bit outputs of a plurality of the output stages of the N stage shift register, the multiplexer producing first and second outputs, the first and second outputs being selected from the data inputs according to the state of the control input, the first and second outputs being provided to the exclusive-OR gate as inputs.

14. A controllable noise pattern generator for use in video special effects, the controllable noise pattern generator comprising:

a first modifiable pseudo-random pattern generator having control inputs and an n-bit parallel output;

a second modifiable pseudo-random pattern generator having control inputs and an m-bit parallel output; and a multiplexer receiving the output of the first modifiable pseudo-random pattern generator and the output of the second modifiable pseudo-random pattern generator and having a selection control input, the multiplexer producing an output pattern of numbers which are a selectable combination of individual bits from the first modifiable pseudo-random pattern generator n-bit parallel output and the second modifiable pseudo-random pattern generator m-bit parallel output according to the selection control input.

15. A controllable noise pattern generator according to claim 14 further comprising:

a filter disposed to filter the output pattern.

16. A controllable noise pattern generator according to claim 15 wherein the filter comprises one or more of the following filters:

a high-pass filter;

a low-pass filter; and chrominance frequencies blocking filter.

17. A controllable noise pattern generator according to claim 15 wherein the modifiable pseudo-random pattern generator comprises:

pseudo-random pattern generation means including a feedback path and producing a output pattern of numbers; and feedback modifying means disposed in the feedback path for changing the feedback to modify the output pattern.

18. A controllable noise pattern generator according to claim 17 wherein the pseudo-random pattern generation means has an enable input and the modifiable pseudo-random pattern generator further comprises:

means for dividing a system clock signal, the dividing means being disposed on the enable input of the pseudo-random pattern generation means to divide the system clock signal by a number to produce an enable pulse that occurs less frequently than the system clock signal so that numbers produced by the modifiable pseudo-random pattern generator can be made to persist for a number of periods of the system clock signal.

19. A controllable noise pattern generator according to claim 18 wherein the pseudo-random pattern generation means also has a load input and a load control input, a load value being loaded into the load input upon the occurrence of a load control signal at the load control input, and the modifiable pseudo-random pattern generator further comprises:

means for dividing a horizontal signal occurring once per interval of a device utilizing the output pattern by an integer to produce a new line signal;

means for modifying the load value upon the occurrence of the new line signal; and means for supplying the load control signal to the load control input of the pseudo-random pattern generation means upon the occurrence of each horizontal signal so that identical patterns are produced by the modifiable pseudo-random pattern generator the integer number of times until a new line signal occurs.

20. A controllable noise pattern generator according to claim 17 wherein the pseudo-random pattern generation means has a load input and a load control input, a load value being loaded into the load input upon the occurrence of a load control signal at the load control input, and the modifiable pseudo-random pattern generator further comprises:

means for dividing a horizontal signal occurring once per interval of a device utilizing the output pattern by an integer to produce a new line signal;

means for modifying the load value upon the occurrence of the new line signal; and means for supplying the load control signal to the load control input of the pseudo-random pattern generation means upon the occurrence of each horizontal signal so that identical patterns are produced by the modifiable pseudo-random pattern generator the integer number of times until a new line signal occurs.

21. A controllable noise pattern generator according to claim 17 wherein the pseudo-random pattern generation means has a load input and a load control input, a load value being loaded into the load input upon the occurrence of a load control signal at the load control input, and the modifiable pseudo-random pattern generator further comprises:

means for modifying the load value so that the pattern produced by the modifiable pseudo-random pattern generator is modified following the occurrence of the load control input.

22. A controllable noise pattern generator according to claim 17 wherein the pseudo-random pattern generation means comprises:

an N stage shift register having as the feedback path outputs from two stages coupled to an input through an exclusive-OR gate, bit outputs of some or all of the N stages forming the numbers of the output pattern.

23. A controllable noise pattern generator according to claim 22 wherein the feedback modifying means comprises:

a multiplexer having a control input and data inputs coupled to receive a plurality of output stages of the N stage shift register, the multiplexer producing first and second outputs, the first and second outputs being selected from the data inputs according to the state of the control input, the first and second outputs being provided to the exclusive-OR gate as inputs.

24. A controllable noise pattern generator according to claim 17 wherein the feedback modifying means comprises:

a multiplexer having a control input and data inputs coupled to receive bits of the numbers of the output pattern, the multiplexer producing first and second outputs, the first and second outputs being selected from the received bits according to the state of the control input; and an exclusive-OR gate receiving the first and second outputs of the multiplexer and producing a modified feedback signal.

25. A controllable noise pattern generator according to claim 24 wherein the multiplexer also produces third and fourth outputs for selection and the exclusive-OR gate comprises three exclusive-OR gates with the outputs of two of the exclusive-OR gates supplying inputs to the third exclusive-OR gate.

* * * * *